United States Patent Office 2,845,125
Patented July 29, 1958

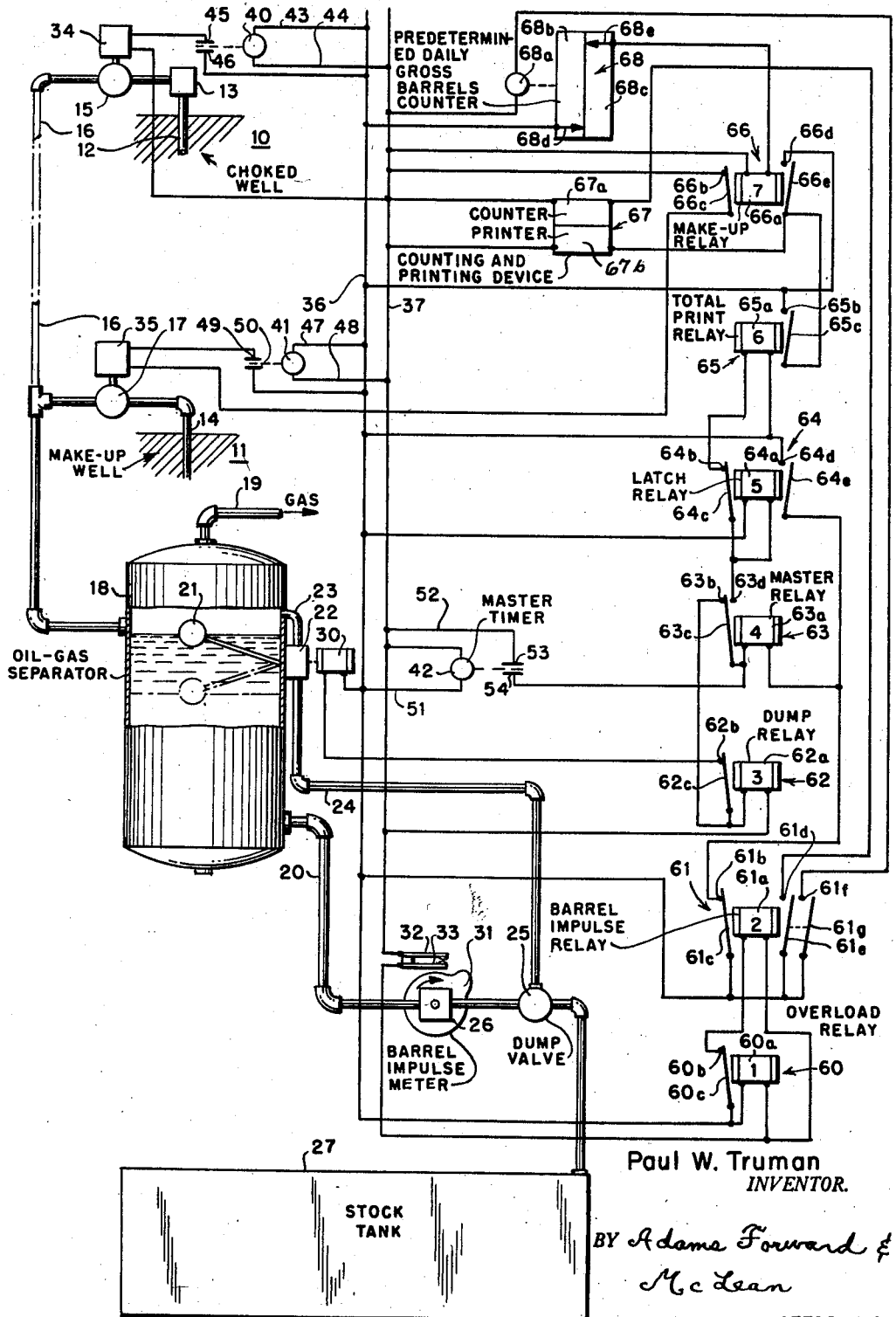

2,845,125

CONTROL OF OIL WELL PRODUCTION

Paul W. Truman, Tulsa, Okla., assignor to Sinclair Oil & Gas Company, Tulsa, Okla., a corporation of Maine Application November 2, 1955, Serial No. 544,421

4 Claims. (Cl. 166—52)

My invention relates to the control of oil production and in particular provides an apparatus for achieving maximum permissible production from a group of wells in accordance with arbitrarily assigned limitations on rate of oil production.

In many oil producing localities conservation of oil reserves is now being practiced by assignment, either by agreement between producers in the area, or by law, of arbitrary maximum limits on the quantity of oil produced in a given period of time either from each well or in a unit area. Such arbitrary limits on oil production are commonly referred to as "allowables." The use of chokes and similar mechanical devices is frequently resorted to in order to adjust flow from each well to the allowable for the well. Such mechanical contrivances are not altogether reliable in the sense that changes in sub-surface conditions, or the inclusion of dirt, sediment or other foreign matter in the flow regulating surfaces of the choke or other mechanical flow regulator, cause departure in the rate of oil production from that to which the choke or other device is set. In operating a field of wells such departures from set flow rate can render it extremely difficult to control production from the field such that daily allowable production is not exceeded, and yet such that total production is not substantially short of the daily allowable for the field. As a consequence, there is a demand for a system of operating an oil lease in which such departures from set flow rate are nullified and oil production on the lease each day achieves that maximum production which is permissible.

It is a primary object of my invention to provide an apparatus for controlling oil well production from a group of oil wells by which maximum allowable production is achieved. It is a further object of my invention to provide such an apparatus which is readily applicable to any group of oil wells operating as a unit without requiring complicated or extensive additions to the presently available control instruments. It is yet another object of my invention to provide such an apparatus which automatically assures daily production will be that which is exactly allowable.

These and other objects of my invention are essentially obtained by dividing each producing day into several (at least two) successive periods and scheduling certain wells or groups of wells to flow during each such period. Each well choke is adjusted to produce the well's prorated amount, except on such wells as are scheduled to flow during the last period of the daily schedule. The wells scheduled to flow during the last period of the daily schedule have their chokes set to flow wide open or at least substantially in excess of their prorated amount. These wells are shut down, however, when the total daily allowable for the lease has flowed. Oil produced is continuously counted by a meter in the common collection system and accurate sub-totals for each scheduled period are made by synchronizing the taking of a sub-total at the end of a scheduled period while the oil in the collection system between the meter and wells is cleared to a fixed reference volume.

For a more complete understanding of my invention and its practical application in the control of oil production, reference is made to the appended drawing which diagrammatically represents a group of wells delivering oil to a single point of collection and schematically represents the necessary control apparatus to provide operation of the wells in accordance with my invention.

In the drawing only two wells, 10 and 11, are illustrated. It will be apparent that the well 10 can operate in a parallel arrangement with any number of wells, and similarly well 11 can operate in a parallel arrangement with any number of wells. It will be further apparent upon further description that a series of such groups of wells 10 can be employed which is limited in number of groups only by practical limits as to the rate of flow which can be achieved in the group of wells with reference to the prorated allowable production since the greater the number of wells employed, the lesser the period of time which their operation is scheduled. I have found in particular it is useful to employ a series of thirty-one groups of wells similar to the group diagrammatically represented by the reference numeral 10 and a single group similar to that represented by the reference numeral 11.

Well 10 is provided with tubing 12 which extends into petroleum deposit from which oil is being recovered in the conventional manner and which is provided with a choke represented by the reference numeral 13 located usually at the upper end of the string of tubing 12. Well 11 is similarly provided with tubing 14 which extends into the petroleum deposit but does not require a choke and hence none is shown in the drawing. A choke can be employed, however, but normally will be operated wide open in carrying out my invention. Tubing 12 at the casing head of well 10 is connected to a hydramotor valve 15 which is simply an electrically controlled, fluid operated, piston valve for opening and closing external connection of tubing 12 to a header 16. Tubing 14 at the casing head of well 11 is similarly externally connected to header 16 through a hydramotor valve 17. Any other wells or groups of wells which might be employed would similarly be connected to header 16.

Header 16 is connected to deliver oil from wells 10 and 11 to separator tank 18 which is provided at its upper end with a connection 19 for removal of gas. Near its lower end separator tank 18 is provided with a second connection 20 for removal of oil. A float 21 operated, gas valve 22 is mounted on the side of separator tank 18 with float 21 positioned within separator tank 18. A connection 23 near the upper end of tank 18 passes to valve 22, and a connection 24 extends from valve 22 to a gas-operated, oil valve 25 connected in line 20 through which oil is discharged from tank 18 through a meter device 26 and valve 25 to stock tank 27. A battery of stock tanks 27 will ordinarily be employed.

Gas valve 22 is a conventional float-operated valve having a toggle action such that as float 21 rises to a maximum position in tank 18, indicated in solid lines in the drawing, valve 22 is snapped open to permit gas to flow through connection 24 and operates valve 25 to open oil line 20 and discharge oil from separator tank 18 to stock tank 27. Valve 25 is operated by a gas pressure against a diaphragm so that when pressure of gas from the upper space in tank 18 is exerted upon the diaphragm in valve 25 it remains open to permit oil to pass therethrough. The toggle action of valve 22 is such that it remains open, once tripped, until float 21, which rides level with the surface of oil in separator tank 18, reaches a lower limit, indicated in dashed lines. At that point the toggle actuating mechanism in valve 22 is tripped in the reverse directon to close the gas valve 22 and simultaneously to exhaust connection 24. Valve 22 remains in such position until the oil level in tank 18 carries float 21 back to the solid line position. A solenoid 30 has its armature connected to the toggle mechanism of valve 22 such that when the solenoid is energized its armature trips the toggle mechanism as if float 21 had reached the solid line position. Thus, when valve 22 is tripped by solenoid 30, valve 22 remains open until float 21 reaches the lower dashed line position.

Meter 26 is also a conventional device provided with vanes (not shown) which are actuated by the flow of oil to rotate a cam 31 which is positioned to make normally open contacts 32 and 33 once for each rotation. The areas and pitch of the vanes is set such that each rotation of cam 31 is equal to the passage of one barrel of oil through meter 26. This type of device is sometimes referred to as a barrel impulse meter.

Hydramotor valves 15 and 17 are each controlled by the armatures of solenoids 34 and 35, respectively, such that when the solenoid 34 or 35 is energized its armature opens the valve 15 or 17, respectively. Spring biasing is employed to close valves 15 and 17 when their respectively associated control solenoids 34 and 35 are unenergized.

The electrical control system by which this arrangement of components is operated in accordance with my invention is powered from a suitable alternating current source feeding power lines 36 and 37. It will be apparent, of course, that more than one set of power lines can be employed in operating the control apparatus, and in fact the different loads carried by the various electrical components requires, as a practical matter, different voltages. It is essential, however, that the clock mechanisms employed be synchronized and consequently at least the clock mechanisms must be ultimately connected to the same well regulated alternating power source. The clock mechanisms include, in particular, synchronous timers 40, 41 and 42.

Timer 40 has its motor connected across power lines 36 and 37 by means of electrical lines 43 and 44. The motor of timer 40 operates a pair of normally open contacts 45 and 46 which are connected in series with solenoid 34 across power lines 36 and 37 such that as timer 40 operates to close contacts 45 and 46 a circuit is established which energizes solenoid 34 and opens valve 15.

Timer 41 has its motor connected across power lines 36 and 37 by means of electrical lines 47 and 48, respectively. The motor of timer 41 operates a pair of normally open contacts 49 and 50. These contacts are connected in series with solenoid 35 in a circuit described hereinafter in more detail.

Master timer 42 has its motor connected across power lines 36 and 37 by means of electrical lines 51 and 52, respectively. The motor of master timer 42 operates a pair of normally open contacts 53 and 54 connected to control several circuits, the operations and details of which will be described more fully hereinafter.

In addition to the timing mechanisms employed in the electrical control system, the control system includes seven relays, that is overload relay 60 which operates with a one-minute time delay, barrel impulse relay 61 which is a fast-acting relay, dump relay 62 which operates with a one-second time delay, master relay 63 which operates with a two-minute time delay, latch relay 64 which operates with a one-second time delay, total printing relay 65 which is a fast-acting relay, and make-up relay 66 which likewise is a fast-acting relay.

In addition to the various control relays employed, the arrangement shown in the drawing also includes several devices for counting and recording daily production. These include a counting and printing device 67, of which section 67a operates to add one on each closure of the electrical circuit to it and section 67b prints the total count when energized. Device 67 can be reset by hand or by remote electrical connection. The mechanical components also include predetermined daily gross barrels counter 68 which is operated by a motor or solenoid 68a to move each of wheels 68b and 68c one calibrated position in opposite directions upon each energization of coil 68a. Wheels 68b and 68c are white and red, respectively, and are marked with inverse scales which read through an appropriate indexing mechanism (not shown), such that the white wheel scale indicates the additive total number of impulses energizing motor 68a from the time in which the wheel was set to indicate zero. Red wheel 68c at the initial set point is positioned with its scale at the indexing means to read a value equal to the total number of allowable barrels for the day. This wheel subtracts one indicated value for each impulse delivered to motor 68a. Predetermined daily counter 68 is further provided with a pair of moving contacts, 68d affixed to white wheel 68b and 68c affixed to red wheel 68c. These contacts are arranged to make when the value indicated on the scale on wheel 68b is equal to the daily allowable and, consequently, the value indicated on the scale on wheel 68c equals zero.

Overload relay 60 includes an energizing solenoid 60a and a pair of normally closed contacts 60b and 60c. Barrel impulse relay 61 includes an actuating coil 61a, a pair of normally closed contacts 61b and 61c and two pairs of normally open contacts 61d and 61e, and 61f and 61g. Dump relay 62 includes an actuating solenoid 62a and a pair of normally closed contacts 62b and 62c. Master relay 63 includes an actuating solenoid 63a and three contacts, 63b, 63c and 63d. Contacts 63b and 63c are normally closed and contacts 63c and 63d are normally open. Latch relay 64 includes an actuating solenoid 64a, a pair of normally closed contacts 64b and 64c and a pair of normally open contacts 64d and 64e. Total printing relay 65 includes an actuating solenoid 65a and a pair of normally open contacts 65b and 65c. Make-up relay 66 includes an actuating solenoid 66a, a pair of normally closed contacts 66b and 66c and a pair of normally open contacts 66d and 66e.

The electrical control system involves interconnection of timer 41, master timer 42, barrel impulse meter 26, gas valve 22, predetermined daily gross barrels counter 68 and adding and printing device 67. In particular barrel impulse meter 26 has its contacts 32 and 33 connected in series with solenoid 60a across power lines 36 and 37, such that each time contacts 32 and 33 make when meter 26 passes another barrel of oil, solenoid 60a is energized.

Solenoid 61a of the barrel impulse relay is connected in series with normally closed contacts 60b and 60c paralleling solenoid 60a. Thus, each time a barrel of oil passes through meter 26 and solenoid 60a is energized, solenoid 61a is also energized. If cam 31 hangs on the make points of contacts 32 and 33 for an interval of one minute, contacts 60b and 60c open and remain open until contacts 32 and 33 again part. This mechanism serves primarily to insure contacts 61b and 61c closing so total print can be accomplished if meter 26 should stop with its cam 31 in the make position.

Contacts 61d and 61e of barrel impulse relay 61 are connected in series with the counting portion 67a of counter and printer 67 across power lines 37 and 36, respectively. Thus, each actuation of contacts 32 and 33 adds one count in device 67. Contacts 61f and 61g of the barrel impulse relay are similarly connected in series with motor 68a of predetermined daily counter 68 in series between power lines 36 and 37, respectively. Thus, each barrel passing through meter 26 moves wheels 68b and 68c one step closer to the point at which contacts 68d and 68e make.

Normally closed contacts 61b and 61c of the barrel impulse relay are connected in series with solenoid 63a of the master relay 63 and contacts 53 and 54 of master timer 42 across power lines 36 and 37. In this manner each barrel passing through meter 26 de-energizes solenoid 63a of master relay 63 when master timer contacts 53 and 54 are closed.

The solenoid 62a of dump relay 62 is connected in series with normally closed contacts 63b and 63c of master relay 63 and master timer contacts 53 and 54 across power lines 36 and 37. Normally closed contacts 62b and 62c of the dump relay are connected in series through contacts 53 and 54 of master timer 42 and normally closed contacts 63b and 63c of the master relay with solenoid 30 across power lines 37 and 36, respectively. Energization of dump relay 62 which occurs as master timer contacts 53 and 54 close, thus trips float control valve 22 to operate gas operated valve 25 to dump separator tank 18 to its lower predetermined level. Since contacts 62b and 62c open after a delay of one second following energization of relay 62, energization of solenoid 30 is limited to one second and thus the tripping action on valve 22 does not hamper return to normal control of valve 22 by float 21.

Normally open contacts 63c and 63d of the master relay are connected in series through master timer contacts 53 and 54 with solenoid 64a of latch relay 64 across power lines 37 and 36, respectively. When timer 42 times out latch relay 64 is thereby also energized. Normally open contacts 64d and 64e of latch relay 64 are connected in series with coil 63a of the master relay and timer contacts 53 and 54 between power lines 36 and 37. Thus, contacts 64d and 64e parallel contacts 61b and 61c; so that, as timer 42 times out and energizes coil 63a of the master relay 63, barrel impulse relay 61 is shunted after a delay of two minutes following the last opening of contacts 61b and 61c to hold the energization of coil 63a preventing such energization from being broken by subsequent passage of oil through meter 26 which would actuate barrel impulse relay 61. The purpose of this arrangement will be described more fully hereinafter.

Normally closed contacts 64b and 64c of latch relay 64 are included in a potential circuit between power lines 36 and 37 which includes in series solenoid 65a of the total printing relay, normally open contacts 63d and 63c of the master relay and contacts 53 and 54 of the master timer. Thus, as latch relay 64 is actuated after a two-minute delay, as noted above, to lock up master relay 63, at the same time the total printing relay is energized during the one-second delay between energization of coil 64a and actuation of the contacts of relay 64.

Normally open contacts 65b and 65c of the total printing relay are connected in series between power lines 36 and 37 through sub-total printing section 67b of counting and printing device 67.

Make-up relay 66 has its actuating coil 66a connected in series across power lines 37 and 36, respectively, through contacts 68e and 68d of predetermined daily counter 68, such that as the total daily allowable is reached and counted, relay 66 breaks normally closed contacts 66b and 66c and closes normally open contacts 66d and 66e. The latter pair of contacts are connected in parallel with contacts 65b and 65c and thus effect an immediate printing of the total barrels at that moment. The former pair of contacts are connected in series across power lines 37 and 36 through solenoid 35 and contacts 49 and 50 of timer 41. Thus, the breaking of contacts 66b and 66c closes hydramotor valve 17 and shuts off make-up well 14 to prevent further oil from flowing during the period.

In operation of a lease involving a large number of wells, the wells are, for example, connected in thirty-two groups. Each of the first thirty-one groups is typified by well 10 in the drawing. Timers 40 are set to schedule flow from such groups consecutively for forty-five minute periods. Thus, the first group starts flowing at the beginning of the day and flows for the first forty-five minutes of the day and then shut down for the remainder of the day. The second group then starts flowing, and so forth. The thirty-second group is typified by well 11. Timer 41 is set to schedule flow from the thirty-second group during the last forty-five minute period of the producing day.

Oil from all the wells in the lease is delivered through line 16 to separator tank 18 in which gas and oil are separated and from which oil is delivered through barrel impulse meter 26 and thereafter delivered to a single or battery of stock tanks 27.

Master timer 42 is set to close its contacts 53 and 54 for the first twelve minutes of each forty-five minute period. At the beginning of each operating day predetermined daily gross barrels counter 68 is set with the scale on wheel 68b at zero and with the scale on wheel 68c at the total daily allowable for the entire lease. Counting and printing device 67 is cleared to start at zero and the chokes on all the wells in the first thirty-one groups are adjusted such as flow produced from each well is its prorated amount. The thirty-second group of wells are permitted to run wide open. The last group can, of course, be run with their chokes set to permit flow at any rate less than wide open but greater than the prorated allowable for such group.

As each operating day commences, and through the end of the thirty-first period of operation in such day, the operation throughout each such period is identical. Oil and gas from the wells in the group operating commence to flow as timer 40 closes contacts 45 and 46 to energize solenoid 34 and thereby open hydramotor valve 15. The flow of oil and gas proceeds to separator tank 18 causing the level to rise in the tank from the lower dashed position to the upper solid line position, whereupon float 21 trips valve 22 opening dump valve 25 to permit the oil to be discharged from tank 18 until it again reaches the lower dashed line position, at which point valve 22 is tripped to the closed (exhaust) position and dump valve 25 closes. Charge and discharge of separator tank 18 may occur at any time during each of the thirty-one operating periods.

Each time tank 18 is discharged, the discharged oil passes through barrel impulse meter 26, causing contacts 32 and 33 to make once for each barrel of oil passing. As a consequence, daily counter 68 is operated to move the scale on wheel 68b additively to indicate the number of barrels of oil discharged from tank 18 and wheel 68c is moved subtractively to lower the indicated number of barrels remaining in the daily allowable. Simultaneously, counter section 67a counts the number of barrels discharged.

At the beginning of each of the operating periods, timer 42 operates to close contacts 53 and 54 for the first twelve minutes of the period. This energizes coil 63a of master relay 63 and coil 62a of dump relay 62. The energization of dump relay 62 produces energization of solenoid 30 and thus trips valve 22 to dump separator tank 18 to the dashed line position, which is a volume reference line throughout operations. Master relay 63, which has a two-minute operating delay, does not complete its energization as long as oil continues to flow through barrel impulse meter 26 because of the constant breaking of contacts 61b and 61c of barrel impulse relay 61. When the oil flow ceases because the oil in tank 18 has reached the lower dashed line position, after a two-minute delay, contacts 63b and 63c break, thus releasing dump relay 62 and preventing accidental discharge of separator tank 18.

As contacts 63b and 63c open, contacts 63c and 63d make, energizing latch relay 64. The closing of contacts 63c and 63d at the same time, for the period of one second that contacts 64b and 64c remain closed after energization of relay 64, energizes total printing relay 65 to cause printing section 67b to print on a tape the sub-total from the counter 67a. Thus, a record is made of the number of barrels produced to that point during the day, which at the beginning of the first period represents merely clearing the level in tank 18 to reference level, and which at the beginning of each succeeding period represents the approximate production for the preceding period. The total can be also taken by hand before the twelve-minute period is up, since printer 67b is released after one second. Also, one second after energization of relay 64, contacts 64d and 64e close, locking in energization of master relay 63 for the balance of the twelve-minute period and thus preventing further actuation of dump relay 62 until the end of the particular forty-five minute period.

When timer 40 times out, the next subsequent scheduled period commences by closure of contacts 45 and 46 of the next timer 40 to operate in the sequence of operation, and the cycle of operation described above is repeated. When, however, the thirty-second cycle of operation in the sequence is reached a small difference occurs because the wells in the thirty-second group, typified by well 11, are run above their prorated allowable. The total daily allowable of the lease is thus reached before timer 41 opens its contacts 49 and 50 at the end of the thirty-second period of operation. At that point contacts 68d and 68e make, energizing relay 66, and opening contacts 66b and 66c, which break the circuit to solenoid 35 thereby closing the hydramotor valve 17 connected to well or wells 11 causing the flow of oil from the lease to close. A print of the day's total production is then taken by hand, adding and printing device 67 is cleared, and predetermined daily gross barrels counter 68 is reset for the next day's operation.

I claim:

1. An apparatus for controlling oil production from a plurality of oil wells which comprises conduit means connected to receive the oil output of each of said wells, timer means for controlling oil flow from said wells to said conduit means whereby oil flow is scheduled from different wells in a sequence of at least two successive operating periods, means for adjusting oil flow at a predetermined rate from each of said wells except the wells scheduled to flow in the last period of the sequence, counting means connected to said conduit means for counting the oil flow therethrough, and means operatively responsive to said counting means connected to terminate oil flow to said conduit means from the wells scheduled to flow in the last operating period of the sequence at a predetermined total oil flow through said conduit means during said sequence.

2. An apparatus according to claim 1 which further comprises adding means operatively connected to said counting means to total the amount of flow through said conduit means during said sequence, printing means connected to said adding means for printing said total, timer means operatively synchronized with the termination of each operating period in the sequence for actuating said printing means to print the total oil flow in said conduit means at the termination of each operating period.

3. An apparatus according to claim 1 which further comprises oil accumulating means connected in said conduit means between said wells and said counting means, valve means connected in said conduit downstream of said oil accumulating means, means for opening said valve means to dump oil accumulated in said oil accumulating means, means for closing said valve means when the oil in said oil accumulating means is at a predetermined minimum level, timer means operatively synchronized with the termination of each operating period in the sequence for actuating said means for opening said valve means to release oil accumulated in said oil accumulating means to said predetermined level, whereupon said means for closing said valve means is actuated to reference the level of oil in said oil accumulating means at said predetermined level at the termination of each operating period.

4. An apparatus according to claim 1 which further comprises adding means operatively connected to said counting means to total the amount of flow through said conduit means during said sequence, printing means connected to said adding means for printing said total, oil accumulating means connected in said conduit means between said wells and said counting means, valve means connected in said conduit downstream of said oil accumulating means, means for opening said valve means to dump oil accumulated in said oil accumulating means, means for closing said valve means when the oil in said oil accumulating means is at a predetermined minimum level, timer means operatively synchronized with the termination of each operating period in the sequence for lating means, means for opening said valve means to release oil accumulated in said oil accumulating means to said predetermined level, whereupon said means for closing said valve means is actuated to reference the level of oil in said oil accumulating means at said predetermined level at the termination of each operating period, said timer means thereafter actuating said printing means to print the total oil flow in said conduit means at the termination of each operating period.

References Cited in the file of this patent

UNITED STATES PATENTS

| | | |
|---|---|---|
| 2,143,974 | Chapman | Jan. 17, 1939 |
| 2,627,280 | Adelson | Feb. 3, 1953 |
| 2,631,610 | Gaines | Mar. 17, 1953 |
| 2,652,197 | Berger | Sept. 15, 1953 |